May 13, 1958     A. CLAUD-MANTLE     2,834,626
HOOD LATCH
Filed Feb. 23, 1954     8 Sheets-Sheet 1
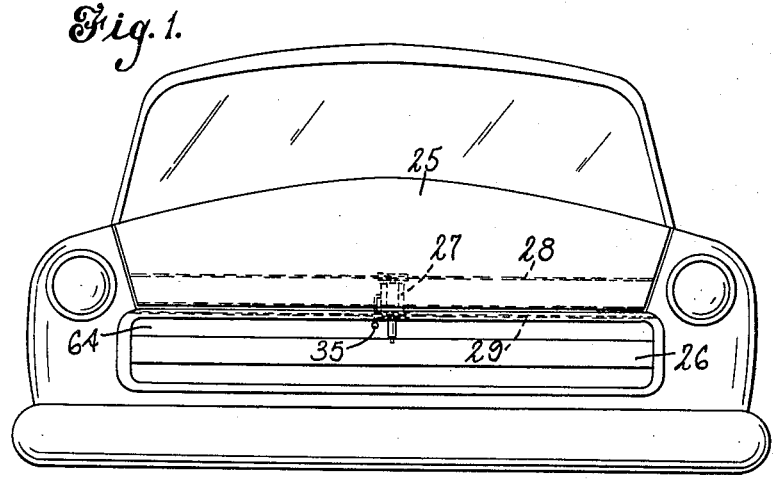
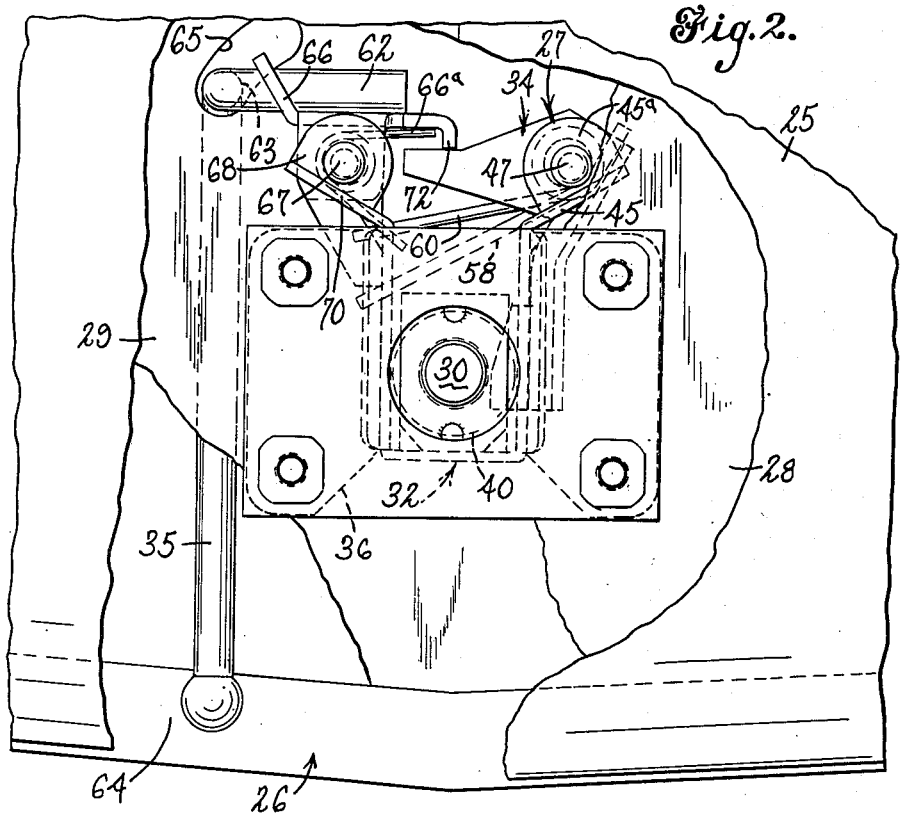
INVENTOR
A. Claud-Mantle
BY
ATTORNEYS

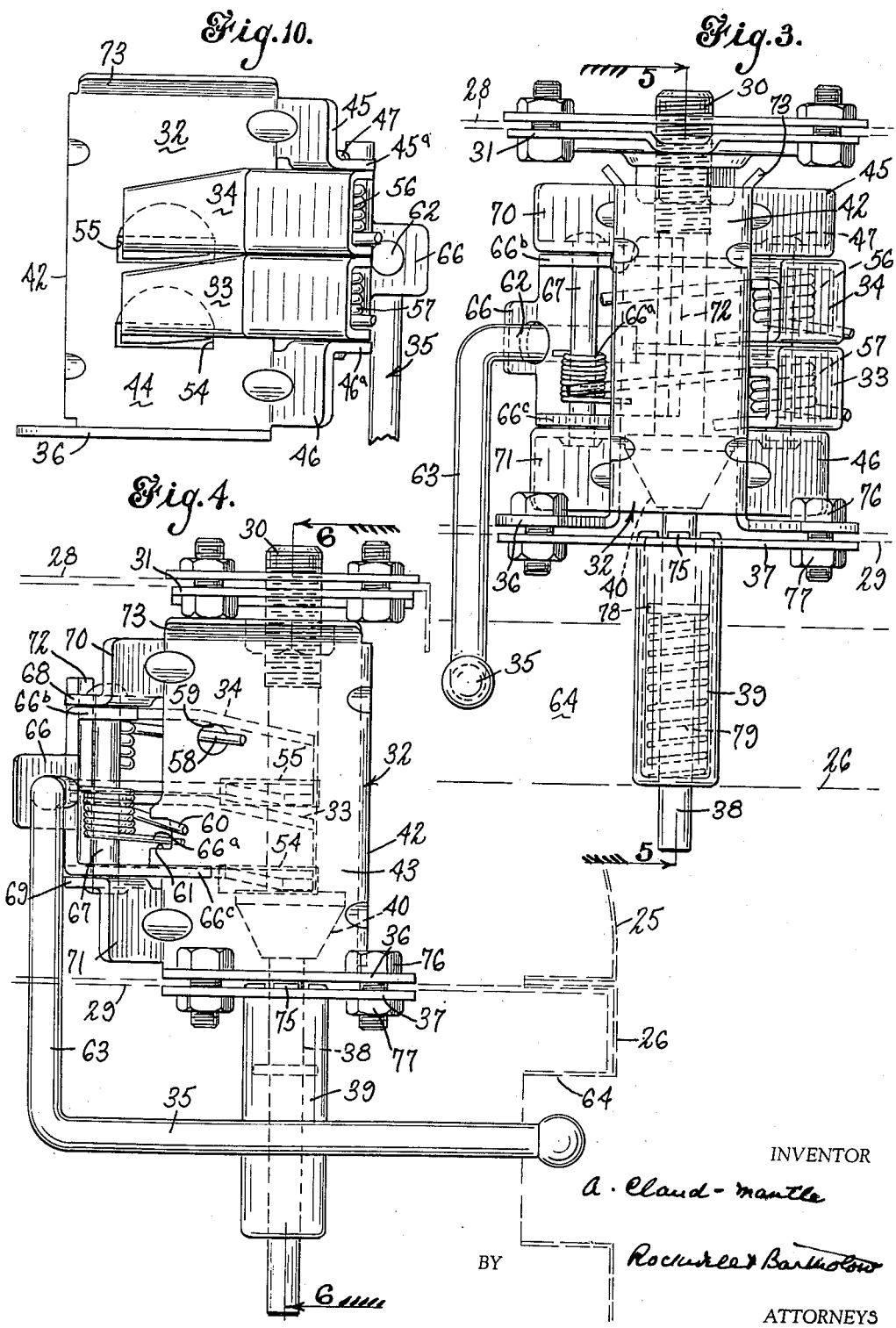

May 13, 1958  A. CLAUD-MANTLE  2,834,626
HOOD LATCH
Filed Feb. 23, 1954  8 Sheets-Sheet 3
Fig. 5.
Fig. 6.
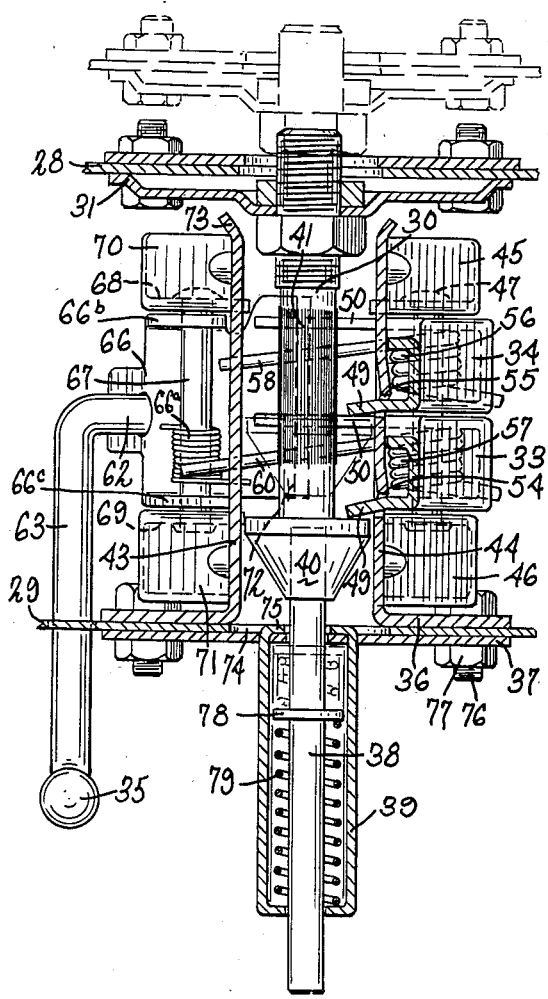
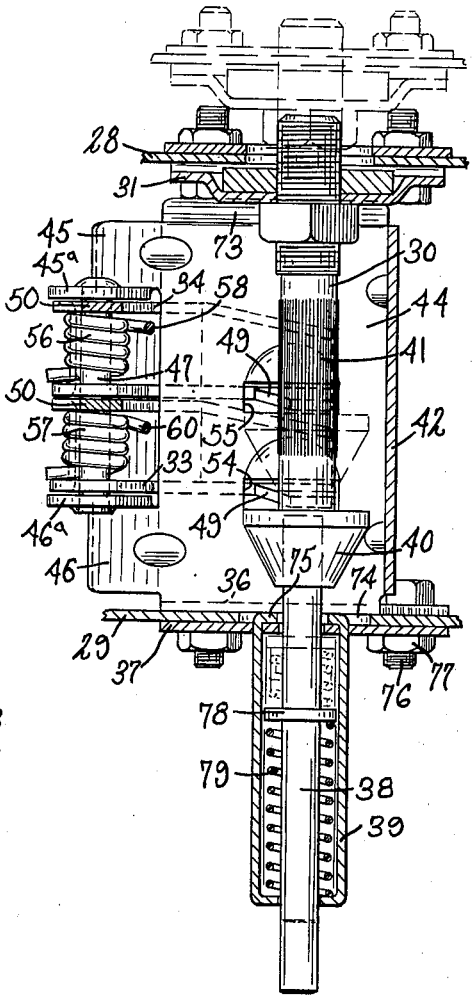
INVENTOR
A. Claud-Mantle
BY Rockwell & Bartholow
ATTORNEYS May 13, 1958 A. CLAUD-MANTLE 2,834,626
HOOD LATCH
Filed Feb. 23, 1954 8 Sheets-Sheet 4
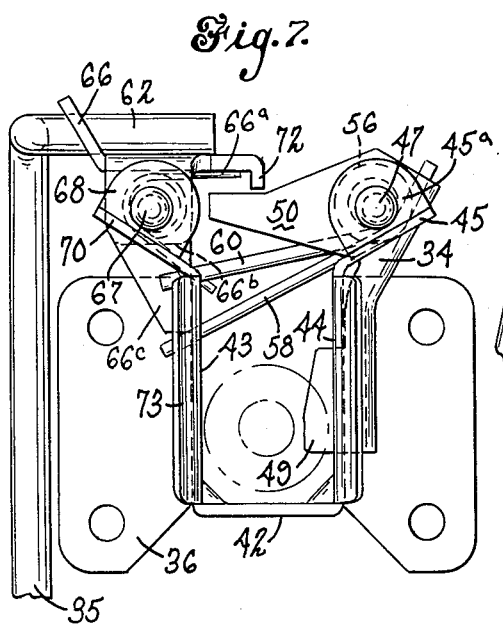
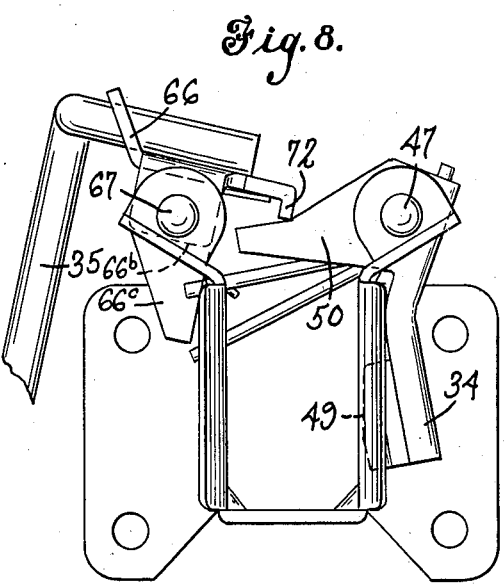
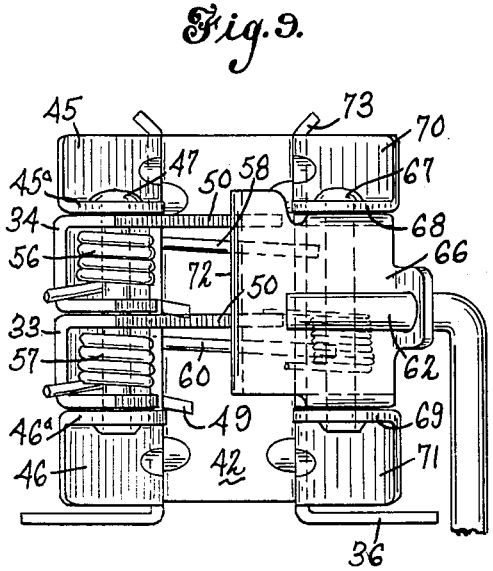
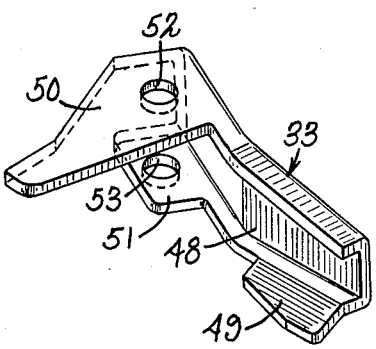
INVENTOR
A. Claud-Mantle
BY
ATTORNEYS May 13, 1958  A. CLAUD-MANTLE  2,834,626
HOOD LATCH
Filed Feb. 23, 1954  8 Sheets-Sheet 5
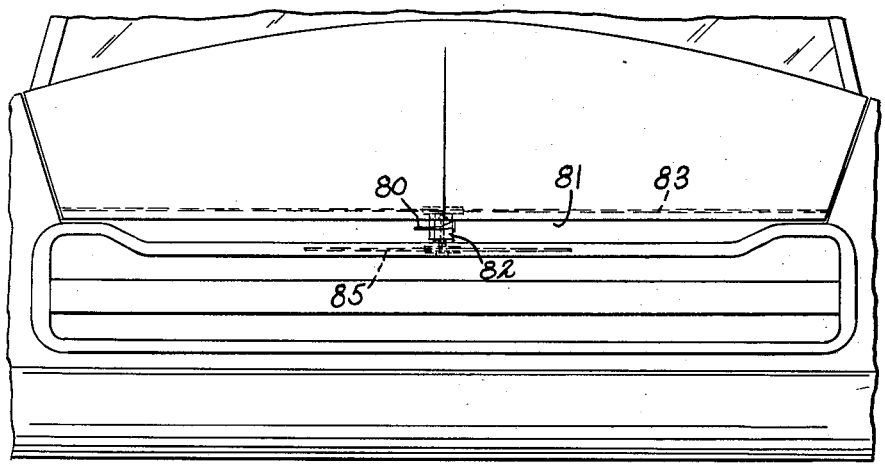
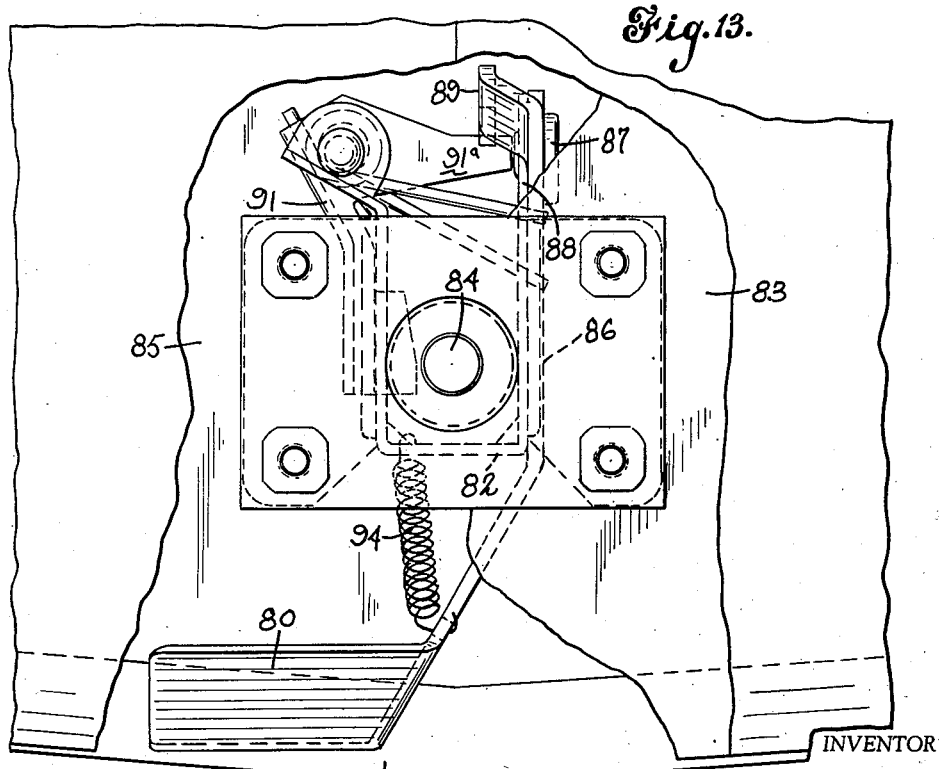
INVENTOR
A. Claud-Mantle
BY
ATTORNEYS May 13, 1958 A. CLAUD-MANTLE 2,834,626
HOOD LATCH
Filed Feb. 23, 1954 8 Sheets-Sheet 7

INVENTOR
A. Claud-Mantle
Rockwell Barkalow
BY
ATTORNEYS

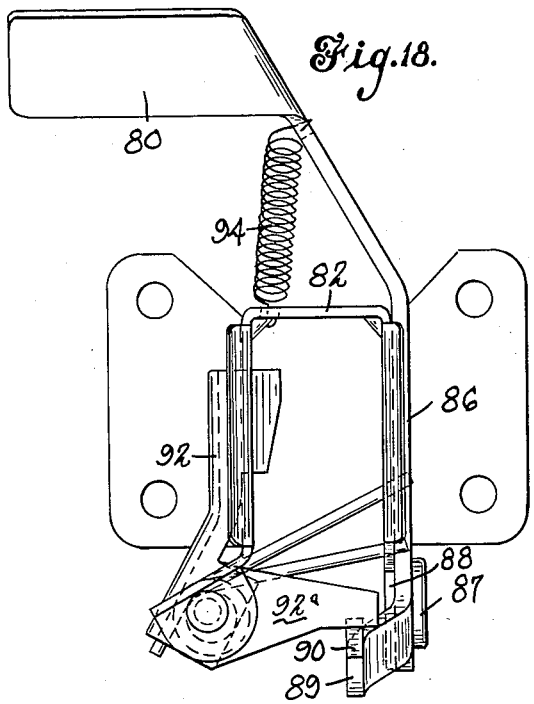
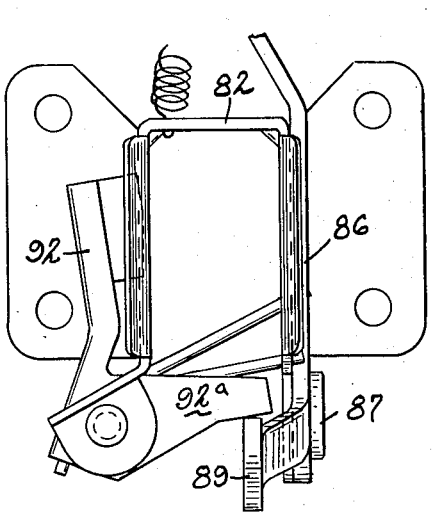
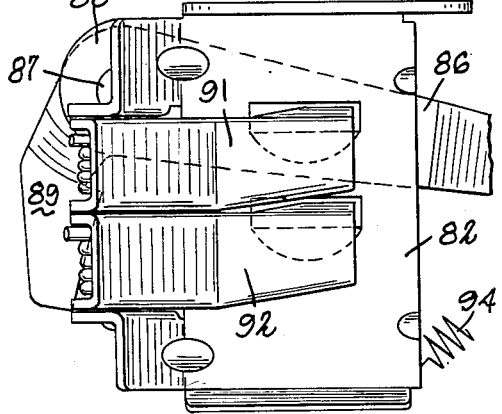
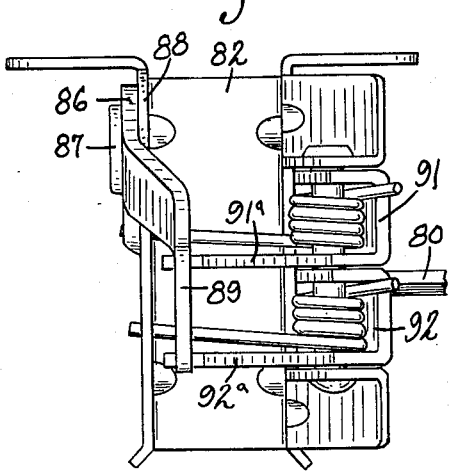

# United States Patent Office 2,834,626
Patented May 13, 1958

2,834,626
HOOD LATCH

Arthur Claud-Mantle, Trumbull, Conn., assignor to The Bassick Company, Bridgeport, Conn., a corporation of Connecticut Application February 23, 1954, Serial No. 411,793

15 Claims. (Cl. 292—52)

This invention relates to hood latches for automobiles, and more particularly to hood latches of the alligator type where the parts of the latch are carried by the forward end portion of the lid and a lower fixed part adjacent a grille at the forward end of the engine enclosure.

An object of the invention is to provide an improved latch of this general type.

Another object is to provide a hood latch of great simplicity and compactness, doing away with the customary latch plate of rather extended area provided with a hole or aperture that surrounds the enlargement or head of the plungerlike or boltlike keeper, not only making the structure simpler, but easier to install.

Another purpose of the invention is to provide improved coordination between the primary latching means and the secondary latching means which latter is customarily referred to as the safety catch.

Another object is to provide a latch in which the primary and secondary latching means cooperate with each other in a novel and beneficial manner.

Yet another object is to furnish a hood latch in which the primary latching means and the secondary latching means are coordinated with novel means for centering and guiding the hood lid in its downward or closing movement, the arrangement being such that in a point of time substantially preceding the cooperation of the keeper head with the primary latching member, in closing the lid, guiding and centering of the lid to prevent misalignment is begun.

In the accompanying drawings:

Fig. 1 is a partial front elevation of an automobile equipped with a hood latch embodying the invention;

Fig. 2 is a fragmentary top plan view with parts broken away of the hood and its latch mechanism, the lid being in its latched position;

Fig. 3 is an elevation of the latch mechanism looking from the front end of the car, certain parts of the hood being indicated by broken lines;

Fig. 4 is a side elevation of the latch with certain parts of the hood shown by broken lines;

Fig. 5 is a section on line 5—5 of Fig. 3, the upper and lower carrying plates for the latching mechanism being shown in this case by full lines;

Fig. 6 is a section on line 6—6 of Fig. 4;

Fig. 7 is a fragmentary top plan view of the lower member of the latch, the primary latching lever and the safety catch lever being in their protracted positions with respect to the channel into which the keeper is projected;

Fig. 8 is a view similar to Fig. 7 showing the two levers in the retracted position;

Fig. 9 is an elevational view of the lower latch member looking toward the front of the car;

Fig. 10 is a side elevation of the lower latch member looking toward the latching levers;

Fig. 11 is a perspective view of one of the levers;

Fig. 12 is a view similar to Fig. 1 showing a modified form of latch in which the keeper instead of being carried by the lid is carried by the lower fixed part of the engine enclosure;

Fig. 13 is a fragmentary top plan view with parts broken away of the latch mechanism shown in Fig. 12, the latch being in the latched position;

Figure 14:
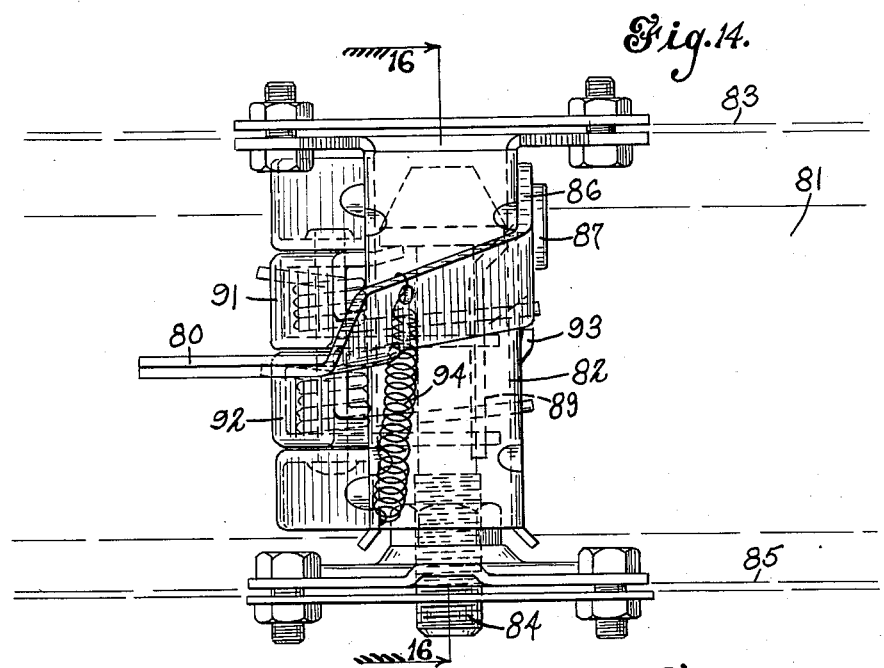
Fig. 14 is an enlarged front elevation of this form of latch.
Figure 15:
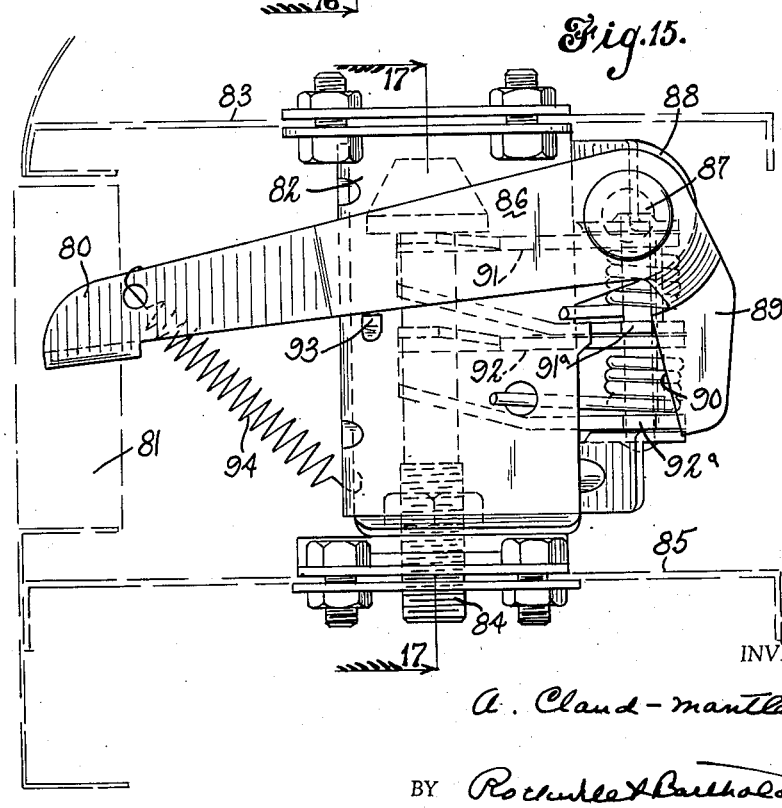
Fig. 15 is a side elevation of the latch mechanism.
Figure 16:
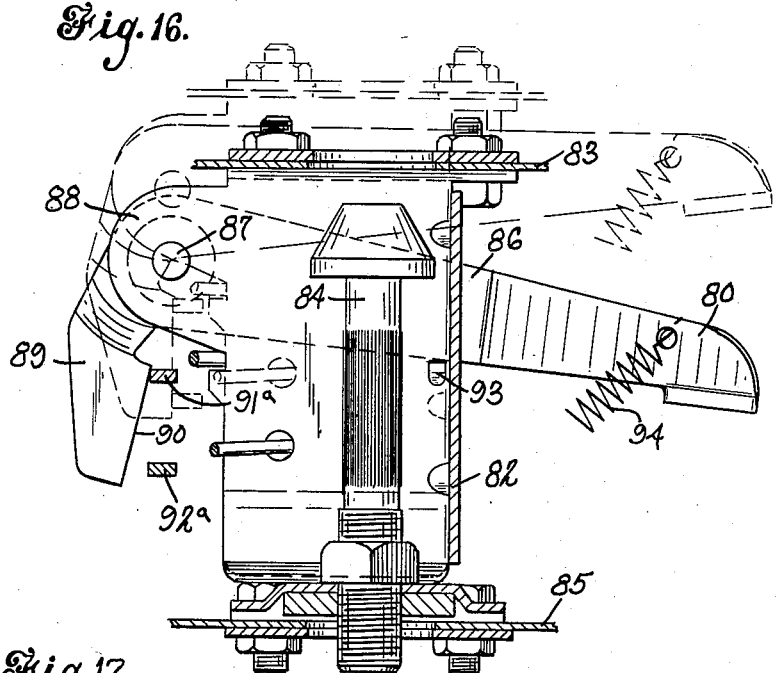
Figure 17:
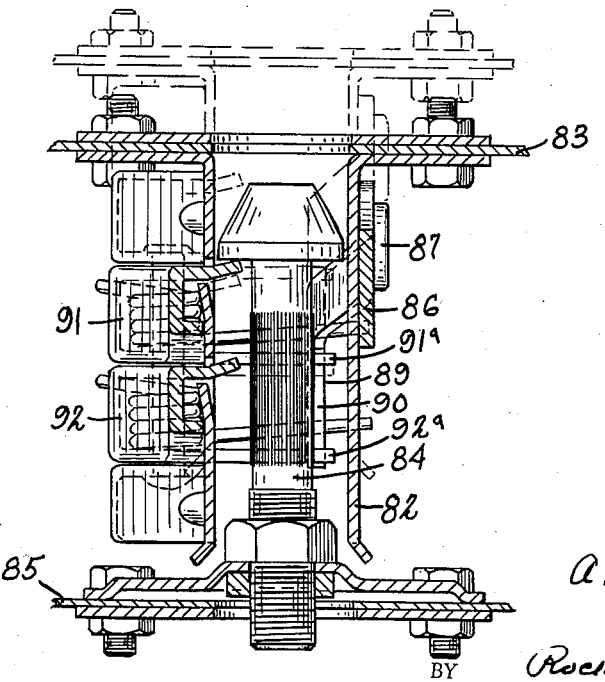

Figs. 16 and 17 are sections respectively on lines 16—16 of Fig. 14 and 17—17 of Fig. 15;

Fig. 18 is a top plan view of the lower latch member, both latch levers being protracted into the latching recess;

Fig. 19 is a view generally similar to Fig. 18 showing the latch levers retracted;

Fig. 20 is a side elevation of this mechanism looking toward the latch levers; and Fig. 21 is an elevational view looking toward the front of the car.

In the form illustrated by way of example in Figs. 1 to 11 inclusive, the assembly includes a depending rigid keeper in the form of a plunger or post carried by the forward end of the lid, and having a partly conical head at the lower extremity adapted to be latched by a latching member mounted on the lower fixed part of the engine enclosure. As a part of the latch mechanism there is provided a lifting spring for the lid but this spring, instead of embracing the keeper as in some prior latches, is mounted upon the lower member of the hood and is movable upwardly to engage the lower end of the keeper and push it in an upward direction as hereinafter more particularly described. The keeper is generally of the kind described in my application, Serial No. 396,215, filed December 4, 1953, and is mounted from the lid in a similar manner, the mounting for the keeper comprising upper and lower attaching plates between which is a platelike keeper-carrying member which is provided within the hood lid as described in said application. In this case, the lower member of the latch, instead of including a main latch plate having a hole or aperture into which the keeper head is projected, is provided with a primary-latch-equipped upright channel member within which the keeper is latched. This member has lower flanges or foot portions by means of which it is secured to the mounting plate carried by the lower fixed hood member, this lower carrying plate being sandwiched between the channel member and a mounting plate laid against the undersurface of the carrying plate. In this form the mounting plate just referred to which is underneath the carrying plate has associated with it and supports a depending case within which is mounted a spring-pressed, slidable stem or plunger adapted to be abutted by the lower end of the keeper and to push the keeper upwardly to the safety position when the primary latching lever is released. The channel portion of the latch referred to above serves as a member to center and guide the keeper when the lid is being closed, and this channel portion or member has associated with it at one side a primary latch member which is in the form of a lever mounted to swing in a horizontal direction and having a lug adapted to overlie the keeper head for the purpose of holding the hood lid in the latched position. The channel member also has associated with it at the same side as the said latching lever a safety-catch lever which is substantially identical to the primary lever, but located at a somewhat higher level so that there is a space in the channel member between the lugs of the two levers in which the head of the keeper is held in the safety position as hereinafter described.

The latching lever and the safety-catch lever are manually releasable from the forward end of the hood by a common operating member which in this form is a laterally swingable lever mounted on the rear part of the latch mechanism and having a manipulating part extending forwardly alongside the latch mechanism, with a forward terminal disposed in a horizontal slot of the grille. This releasing lever has a lateral rear end portion adapted to engage parts of the latching lever and the safety-catch lever for the purpose of retracting those levers from the guide channel, as hereinafter described.

In the drawings, the rearwardly hinged hood lid is indicated at 25, the grille at the lower forward end of the hood at 26, the latch device in general at 27, the carrying plate within the upper part of the lid at 28, the carrying plate fixed to the lower stationary part of the hood at 29, the rigid depending keeper at 30, the mounting for the upper end of the keeper at 31, the lower latch member at 32, the primary latching lever at 33, the safety-catch lever at 34, the latch-releasing lever at 35, the foot portions of the channeled keeper-receiving member at 36, the mounting plate applied to the lower surface of the lower carrying plate 29 at 37, the lid-lifting spring-pressed stem at 38, and the casing containing the stem and attached to the plate 37 at 39.

Referring first to the keeper 30, this is provided at the lower end with a round partially conical head 40, and the keeper and its mounting are substantially the same as those described in my application Serial No. 396,215. In this construction, the keeper is provided with upper mounting plates between which the upper carrying plate 28 is sandwiched, and the stem portion of the keeper is provided with a wide band of knurling, indicated at 41, for the purpose of enabling the keeper to have its vertical adjustment effected by hand manipulation. The stem of the keeper being free of any surrounding lid-lifting spring, the keeper is readily accessible for manual adjustment.

Referring now to the structure of the lower latch member 32, this member of channel form is preferably made of sheet metal, with the foot portions 36 integral with the channel at the lower end of the latter, the channel being open at both ends, and comprising a forward transverse wall 42 and integral side walls 43 and 44. These side walls are parallel to each other and extend rearwardly from the transverse wall, as shown in Fig. 7, and the keeper head is adapted to be received in the forward end portion of the channel section with small side clearance, as indicated in Fig. 7. As viewed in Fig. 7, the latching lever 33 and the safety-catch lever 34 are associated with the right-hand side wall 44 of the channel member, having portions movable through slots in the side wall. At the upper and lower parts of this side wall 44, integral vertical lugs 45 and 46 are provided, these lugs being slanted rearwardly and outwardly from the median line of the channel, and extending between horizontal portions 45a and 46a of these lugs and supported thereby is a common pivot pin 47 providing a vertical swiveling axis for the levers 33 and 34.

The levers 33 and 34 may be of the same form, and they are substantially identical in this case. The lever 33 is shown in Fig. 11, and it will be noted that this is a sheet metal lever having a main portion 48 of U-shaped cross section having upper and lower flanges, the lower flange being widened to form a lug 49 adapted to overlie the flat upper surface of the keeper head in order to hold the lid closed. The upper flange of this lever is formed at the rear part to provide a lateral rearward extension or arm 50 used in actuating the lever, and below this extension 50 is a widened part 51 of the lower flange of the lever. These parts 50, 51 are provided with perforations 52, 53 through which the swivel pin 47 is passed.

As best shown in Figs. 7 and 8, the levers 33 and 34 have forward and rear portions which are at an obtuse angle to each other, and, as best shown in Fig. 10, the forward end portions of the channeled levers are tapered so that their forward extremities are of reduced vertical dimension. The latching lug of the lever 33 engages a slot 54 in the adjacent wall of the latch member, and the latching lug of lever 34 engages an upper slot 55. Preferably the portions of the side wall of the channel member which provide the upper boundary of the slots 54 and 55 is bulged outwardly to a certain extent for the purpose of strengthening the structure adjacent the slot and inhibiting sticking of the keeper head as it moves upwardly in the guide channel. The keeper-engaging lugs of the levers 33 and 34 preferably have a slight downward and inward tip, as shown in Fig. 6, so as to inhibit sticking of the lever to the keeper head.

Each of the levers 33 and 34 is provided with a spring which normally holds the lever lug 49 in the inward latching position, as shown in Fig. 7. In such position, the upper inturned edge of the lever is held against the side face of the channel member. The springs are preferably coiled wire springs, the coil part of the spring embracing the swivel pin or pivot pin within the rear U-shaped part of the latch lever. Each lever has one end of the coiled spring engaged with the channeled rear portion of the lever, and the opposite ends of the springs in this particular case extend across the rear part of the lid-guiding channel and are engaged with the opposite side wall of the channel. In the drawings, the coil of the upper spring is indicated at 56, and that of the lower spring at 57. The extended end of the upper spring disposed across the lid-guiding channel is indicated at 58, and the extremity of this spring engages a hole 59 in the channel side wall. The corresponding end portion 60 of the lower spring is engaged in a notch 61 at the rear edge of the channel side wall.

The latch-actuating lever 35 has at its rear portion a laterally bent arm 62 connected to the manipulating portion of the lever by a vertical portion 63 of the lever. The manipulating portion lies in a slot 64 of the grille to the left of the longitudinal median line of the latch mechanism, as shown in Fig. 2. The portion 63 of the actuating lever passes upwardly through a clearance slot 65 in the carrying plate 29, as shown in Fig. 2. The laterally turned part 62 of the lever is extended through a hole in a plate 66 and suitably secured to this plate as by welding. The plate 66 has its main portion directed vertically and laterally back of the lid-guiding channel, this plate portion being extended upwardly and downwardly with respect to the rodlike portion 62, and the plate 66 is pivotally mounted on a pivot pin 67 having a mounting from the rear end of the channel corresponding to the mounting of the swivel pin 47. The pin 67 is mounted in an upper lug portion 68 and a lower lug portion 69 extending rearwardly and horizontally from the side plate at this side of the channel, each of these portions 68 and 69 being integral with outwardly and rearwardly sloped upright lugs 70 and 71. The primary latching lever 33 and the safety-catch lever 34 are operated by swinging movement of the plate 66 turning on the axis of the pivot pin 67, and for this purpose the plate 66 has a forwardly directed integral upright lip 72, which lip is adapted to engage the extremities of the extensions or arms 50 of the respective levers which in form are elbow levers.

The plate 66 has upper and lower lugs 66b and 66c perforated to receive the pin 67, as shown in Fig. 4. A spring 66a surrounding the pin 67 and acting on the plate 66 tends to hold the lever 35 in the position shown in Fig. 2. The lug 66c abuts the side wall 43 and acts as a stop for the lever 35.

For releasing the latch levers 33 and 34, the forward extremity of the actuating lever is swung to the left with reference to Fig. 1, causing the plate 66 to be swung on its pivot 67, thus causing the lip 72 of the plate to swing forwardly (Fig. 2) the extremities of the latch lever arms, which has the effect of withdrawing the latching lugs from the channel. The released position is shown in Fig. 8. In the form now being described, the latch levers are swung to the releasing position substantially simultaneously. Upon the manipulating portion of the releasing lever being released by the operator's hand, this lever is restored to the initial operating position, in other words, its normal position, by the action of the coil springs on the levers 33 and 34. This actuating lever having the parts 35, 66 and 72 is of elbow form.

For cooperating with the head of the keeper when the lid is being lowered, the upper edges of the side walls of the channel member are preferably provided with flanges 73 that are inclined upwardly and outwardly (Fig. 6) and serve to center the keeper head in the mouth portion of the channel member when the keeper head descends.

The casing 39 for the lid-lifting stem 38 extends downwardly from the lower mounting plate 37, in a position in which it is in alignment with the keeper when the lid is in a latched position. The lower carrying plate 29 on which the lower latch member is mounted is provided with a round hole 74, and the casing 39 is attached to the plate 37 in line with this hole by means of upwardly extending lugs 75 on the casing, which pass upwardly through slots in the plate 37 and are bent over, as shown in Fig. 5, to lock the casing to plate 37. Fastening screws 76, having hexagonal heads above the lower flanges or foot portions of the channel member, pass through holes in these foot portions and holes in the carrying plate 29 and have threaded portions engaging threaded sockets 77 integral with the plate 37. The lid-lifting stem 38 is of greater height than the casing 39, and the extremities of the stem extend out of the casing at both ends of the latter, and the stem is provided somewhat below its upper end with an integral collar 78. A helical spring 79 embraces the stem between the collar 78 and the lower end of the casing. When the lid is lowered, the keeper head engages and presses downwardly on the upper end of the stem, and in the latched position of the lid the stem is held in the depressed position shown in Fig. 5. Upon releasing the lid, the stem will move upwardly under pressure of the spring to the broken-line position shown in Fig. 5, in which position the collar 78 will engage the plate 37 and prevent further upward movement.

With the present construction, knurling of the keeper shank or stem throughout a substantial portion of its length enables the keeper to be turned by hand, as above mentioned, into a position in which the keeper head is accurately located in the vertical direction. Also the keeper can be released from its secured position very readily by hand manipulation in case further adjustment is desirable. It is unnecessary to use a screw driver for adjustment of the keeper.

It will be understood that in the latched position of the lid the keeper head will be above the lower carrying plate 29 in the lowermost portion of the vertical keeper-guiding channel, the upper surface of the keeper head being urged upwardly by the lid-lifting spring but being in engagement with the lower surface of the lug of the primary latching lever so as to prevent further upward movement. In this form, the lug of the safety-catch lever is spaced upwardly to an extent from the upper surface of the primary lever and above the safety-catch lever there is a substantial vertical space between this catch lever and the mouth of the channel member.

It will be understood that in the operation of the improved latch, the latch can be readily released from the latched position by inserting the hand through the grille opening, and moving the manipulating part of the releasing lever in the manner previously described. This will withdraw the lug of the primary latch lever 33 from the channel, and the spring-pressed stem 38 will immediately lift the lid so that the keeper head moves to the safety-catch position. In the form now being described, the releasing lever releases the primary latch lever and the safety-catch lever substantially simultaneously. The effect of this is that when the releasing lever is moved to the released position, the lid will be openable by the operator, using his other hand to lift the lid.

The safety-catch lever prevents full release of the keeper in case the lid, when closed down, is not fully secured, or, due to some cause, escapes from the hold of the latching lever, and in such case the catch lever securely retains the keeper head in a position such as shown by the broken lines in Fig. 5.

When the lid is being closed, the member 32 serves a very important function in precentering the lid and preventing damage to the side edges of the lid and in other places due to the misalignment of the lid at the time that it is being closed and especially when it is being slammed down. The upper end of the channel member receives and guides the keeper head at a distance well above the latched position of the head and guides the keeper to the lower latched position in the channel. As will be observed from Fig. 6, for example, there is a considerable distance from the upper end of the guiding channel to the location where the primary latching lever engages the keeper head, and through this distance the keeper is effectively guided inasmuch as the side walls of the channel are quite close to the periphery of the keeper head. On the other hand, the keeper head, in moving downwardly, has ample clearance in a forward and rearward direction, as will be noted from Fig. 7, for example.

In closing the lid, the keeper head, when it reaches the catch-lever lug, forces the catch lever out of the way against the action of its spring, and the head then passes downwardly to engage the lug of the primary latch lever and to be latched thereby. The lug of the primary lever, after the head passes, moves back quickly to overlie the keeper head and latch the keeper, the latched position being one in which the keeper head is above the lower carrying member for the latch.

It has been explained above that the lid-lifting spring 79 which acts on the lid-lifting stem 38 cannot raise the upper end of the stem beyond the dotted-line position shown in Figs. 5 and 6. As soon as the keeper head, when the lid is being released, reaches the corresponding position, gravity begins to retard the upward movement of the lid, and so the keeper head, while being raised somewhat above the level of the primary latch lug, will remain in the safety-catch position unless the lid is lifted to a greater extent by manual manipulation.

In the modified structure shown in Figs. 12 to 21, inclusive, the chief difference over the form first described arises from the fact that the arrangement of the keeper and the keeper-receiving channel member is reversed, the keeper being an upwardly directed member fixed in position on the lower part of the hood and the channel member being mounted on the lid. In this particular case also, no lid-lifting spring is employed, although, if desired, such a spring may be incorporated in the structure. The provisions for releasing the latch levers by hand manipulation are also different in this form, but most of the latch parts are similar to those previously described.

In this form, as well as in the form first described, the forward edge of the hood lid is shown as lying in immediate proximity to the grille when the lid is closed, no separating member in the nature of a cross member or bridge piece being illustrated, but, if desired, a separate cross member or bridge piece may be used as a support for the forward edge of the lid.

In this second form, the manipulating portion of the latch-releasing member, indicated at 80, is located slightly to the left of the latch keeper and is accessible by way of a recess 81 between the top of the grille and the forward edge of the lid. The upper latch member, comprising the keeper-guiding channel member 82, is applied to the carrying plate 83 associated with the lid in the manner shown in Fig. 14, with the keeper-guiding member in a depending position. The keeper 84 extends upwardly from the lower carrying plate 85, and the latch is engaged by having the latch member carried by the lid moved downwardly over the fixed keeper. The keeper and the channel member and the mountings of these members are similar to those previously described. The manipulating lever portion 80, mentioned above, is a part of a latch-releasing lever 86 pivoted at the upper rear portion of the channel member and swingable in a vertical direction, the releasing of the hood lid in this particular case being produced by upward movement of the manipulating portion 80.

The pivot on which the releasing lever 86 is pivoted is a headed pivot pin 87 passing through the rear end portion of the lever and through a lug 88 projecting rearwardly and integrally from the adjacent side wall of the channel member 82. Rearwardly beyond the pivot the lever has a depending arm 89 having a straight forward edge 90 that is adapted to contact the rear arm portions of the primary latching lever 91 and safety-catch lever 92. These levers are of the same structure and arrangement as in the form first described. The depending portion 89 of the latch-releasing lever 86 is arranged to swing in a vertical plane disposed rearwardly of the channel member and intersecting the end portions of the arms used for swinging the levers 91 and 92. Downward movement of the releasing lever 86 is limited by a stop 93 on the adjacent side wall of the channel member, and a helical spring 94 connecting the forward end portion of the lever with the lower part of the channel member normally holds the lever against this stop. When the releasing lever is against the stop 93, the arm 89 of the lever is in the position shown in Figs. 16 and 17. In this position, the upper end portion of the operating edge 90 of the arm 89 is against the cooperating arm 91ª of the latching lever 91, but at its lower part the edge 90 is somewhat spaced from the cooperating arm 92ª of the catch lever 92, as shown in Fig. 16. When, however, the manipulating end of the releasing lever 86 is lifted, both of the latch levers are swung on their pivotal axes, arm 92ª commencing its movement somewhat later than arm 91ª. In this particular form, as in the form first described, it is preferable to have the latching lugs of the primary and secondary levers clear the channel space substantially at the same moment, and this is accomplished in the construction now under discussion by reason of the fact that the part of arm 90 which operates arm 92ª moves on a longer radius than the part which moves arm 91ª.

The keeper member and the keeper-receiving member and its associated parts operate in the manner previously described, taking into consideration that the keeper is the fixed member rather than the movable member of the assembly. In view of the preceding description, it is thought that the mode of operation of this second latch arrangement will not require detailed description. When the lid is lowered for closing the same, the lower mouth portion of the keeper-guiding channel engages over the upwardly pointed keeper head and the channel then moves down over the keeper head, the catch lever being engaged and swung out of the way, and the latch lever being then engaged and swung out of the way, moving back to underlie the head in the position shown, for example, in Fig. 17.

In the present case, there is no need for a spring to move the lid upwardly when it is released. To release the lid, the manipulating portion of the latch-releasing lid is lifted, and the lid can be given an initial lift by the hand which grasps the manipulating portion of the latch-releasing lever. Upon full actuation of the latch-releasing lever, the safety-catch lever as well as the primary latching lever are fully released as in the first form, and the lid can then be moved upwardly beyond the safety-catch position. If necessary, the other hand of the operator can be used in connection with the lid-lifting operation.

The latch-releasing manually operable lever in this form, which is released by a lifting movement, is of particular advantage where the keeper-receiving part of the latch is carried by the lid, as above described, with omission of a lid-lifting spring, but an inverted arrangement can be employed, if desired, with modifications of the releasing lever or other releasing member. If changes in the manipulating arrangement are necessary to meet a certain condition, these changes will usually be of a very minor character.

It is apparent from the foregoing that by the improved latch structure the lid of the hood is controlled and guided in an improved manner when and as the lid is being closed, so that effective latching is accomplished while at the same time eliminating damage to the lid or adjacent parts of the car due to the misalignment of the descending lid. Moreover, the member which acts as a keeper guide also serves as a latch member in which the head of the keeper is held when the lid is in the latched position. Thus it is possible to eliminate the customary latch plate of rather extended area provided with a hole or aperture that surrounds the head of the keeper. The channel member, which is the preferred form of keeper guide, serves as a guide and also provides latching spaces for the keeper head in two different positions of the latter. As a result, the latch has great simplicity and compactness, and the improved latch is easy to install and adapted to a great variety of conditions. Another advantage is that the primary and secondary latching means associated with the keeper cooperate with each other in a novel and beneficial manner, and that these members are related in a simple way with effective provisions by which the misalignment of the descending hood lid is prevented. While the keeper-guiding channel member is not of great height, it has ample height for preventing misalignment of the lid in descending, and for mounting between its upper and lower ends the primary latching lever as well as the secondary latching lever.

While two forms of the latch are disclosed herein, these are by way of example only, and various modifications and changes in the details may be made without departure from the principles of the invention or the scope of the claims.

What I claim is:

1. In a latch for alligator-type hoods, upper and lower mounting or carrying members respectively applicable to the lid and to the lower fixed part of the hood structure, a keeper fixed to one of said members and having a latching head, and a cooperating latch member fixed to the other of said members and presenting a centering and guiding channel projecting toward the keeper head to guide the lid preliminary to latching, said latch member having independent primary and secondary latching members laterally of said channel cooperating with the keeper head and providing for latching the lid in fully closed and partially closed positions, said primary and secondary members being constituted by levers having latching lugs movable into and out of said centering and guiding channel, and said latch member being provided with a swingable manually operable lever operable from the forward end of the hood for releasing both the primary and secondary latching members.

2. In a latch for alligator-type hoods, upper and lower carrying members respectively applicable to the lid and to the lower fixed part of the hood structure, a substantially straight post-like keeper fixed to one of said members and having a terminal head, and a cooperating latch member fixed to the other member and having a safety-catch member cooperating with said head to latch the lid in safety position, said latch member having a body portion presenting parallel side walls interconnected by an end wall and between which the keeper head is confined with slight lateral clearance, said latch member having an independent primary latching member cooperating with said head to latch the head between said parallel side walls in a position in which the lid is fully closed, and said latch member being provided with a swingable manually operable lever at the forward end of the hood for releasing both the safety-catch member and the primary latching member.

3. In a latch for an alligator-type hood having upper and lower carrying members applied to the lid and to the lower fixed part, a keeper fixed to one of said members and having a latching head, a cooperating latch member fixed to the other of said members and having a safety-catch lever and a primary latching lever cooperating with the keeper head and swingable horizontally in different planes, the safety-catch lever being swingable independently of the primary latching lever said levers engaging the keeper head in different vertical positions of the head to latch it in place, and manually operable lever means at the forward end of the hood for withdrawing said levers substantially simultaneously from the keeper path.

4. In a latch for alligator-type hoods, upper and lower carrier members respectively applicable to the lid and the lower fixed part of the hood structure, a substantially straight post-like keeper mounted on one of the carrier members and having a terminal head, a centering and guiding member for the keeper mounted on the other carrier member and projecting toward the keeper, the guiding member being elongated lengthwise of the hood, and the guiding member being formed of sheet metal and having two side walls interconnected by an integral end wall, a safety-catch lever swingable in a horizontal plane and pivoted to one of said side walls at the end of the guiding member remote from said end wall, the lever being extensible through the last-mentioned side wall for cooperation with said terminal head, and said lever being spring-biased to the operative position thereof, a primary latch lever swingable in a horizontal plane independently of the safety-catch lever, the primary latch lever being pivoted to said one of the side walls at the end of the guiding member remote from said end wall, and the primary latch lever being extensible through the last-mentioned side wall for cooperation with said terminal head in the fully closed position of the lid, the last-mentioned lever being spring-biased to the operative position thereof, each of said levers having an offset arm extending toward the other side wall, and a manually operable lever pivoted to said other side wall at the end of the guiding member remote from said end wall, said manually operable lever having an offset portion engageable with said arms to swing the safety-catch and primary latch levers to their inoperative positions.

5. In a latch for alligator-type hoods, upper and lower carrier members respectively applicable to the lid and the lower fixed part of the hood structure, a substantially straight post-like keeper depending from the upper carrier member and having a terminal head, a centering and guiding member for the keeper projecting upwardly from the lower carrier member and elongated lengthwise of the hood, the guiding member being formed of sheet metal and having two side walls interconnected by an integral end wall, a safety-catch lever swingable in a horizontal plane and pivoted to one of said side walls at the end of the guiding member remote from said end wall, the lever being extensible through the last-mentioned side wall for cooperation with said terminal head, and said lever being spring-biased to the operative position thereof, a primary latch lever below the safety-catch lever and swingable in a horizontal plane independently of the safety-catch lever, the primary latch lever being pivoted to said one of the side walls at the end of the guiding member remote from said end wall, and the primary latch lever being extensible through the last-mentioned side wall for cooperation with said terminal head in the fully closed position of the lid, the last-mentioned lever being spring-biased to the operative position thereof, each of said levers having an offset arm extending toward the other side wall, and a manually operable lever pivoted to said other side wall at the end of the guiding member remote from said end wall, said manually operable lever being swingable in a horizontal plane and having an offset portion engageable with said arms to swing the safety-catch and primary latch levers to their inoperative positions.

6. In a latch for alligator-type hoods, upper and lower carrier members respectively applicable to the lid and the lower fixed part of the hood structure, a substantially straight post-like keeper extending upwardly from the lower carrier member and having a terminal head, a centering and guiding member for the keeper projecting downwardly from the upper carrier member and elongated lengthwise of the hood, the guiding member being formed of sheet metal and having two side walls interconnected by an integral end wall, a safety-catch lever swingable in a horizontal plane and pivoted to one of said side walls at the end of the guiding member remote from said wall, the lever being extensible through the last-mentioned side wall for cooperation with said terminal head, said lever being spring-biased to the operative position thereof, a primary latch lever above the safety-catch lever and swingable in a horizontal plane independently of the safety-catch lever, the primary latch lever being pivoted to said one of the side walls at the end of the guiding member remote from said end wall, and the primary latch lever being extensible through the last-mentioned side wall for cooperation with said terminal head in the fully closed position of the lid, the last-mentioned lever being spring-biased to the operative position thereof, each of said levers having an offset arm extending toward the other side wall, and a manually operable lever pivoted to said other side wall at the end of the guiding member remote from said end wall, said manually operable lever being swingable in a vertical plane and having an offset portion engageable with said arms to swing the safety-catch and primary latch levers to their inoperative positions.

7. In a latch for alligator-type hoods, upper and lower carrying members respectively applicable to the lid and to the lower fixed part of the hood structure, a post-like keeper fixed to one of said members and having a terminal latching head, a cooperating latch member fixed to the other of said members comprising a guide member having parallel walls extending forwardly and rearwardly of the hood and projecting toward the keeper head to guide the lid preliminary to latching, said walls in conjunction presenting a guiding channel, said guiding channel having associated therewith in lateral relationship thereto a safety-catch lever and a primary latching lever engageable by the keeper head in the order named upon closing of the lid, and a manually operable lever mounted on said latch member and operable from the forward end of the hood for releasing said safety-catch lever and said primary latching lever.

8. In a latch for alligator-type hoods, upper and lower carrying members mounted respectively on the lid and the lower fixed part, a post-like keeper fixed to one of said members and having a terminal head, a cooperating latch member fixed to the other member and having a forward and rearwardly disposed channel with parallel side walls extending from said other member toward the keeper head to confine it with slight lateral clearance, said channel being equipped with a safety-catch lever cooperating with the keeper head to latch the lid in safety position, a primary latching lever associated with said channel to latch the keeper head in lid-closing position, and a manually operable lever pivoted on said latch member adjacent one end of said channel and operable from the forward end of the hood for releasing both said safety-catch lever and said primary latching lever.

9. In a latch such as described having upper and lower carrying members on the lid and on the lower fixed part, a keeper fixed to one of said members and having a terminal head, a cooperating latch member fixed to the other of said members and provided with a forward and rearwardly directed channel having side walls projecting toward the keeper head for guiding the lid in closing, said channel having associated therewith laterally thereof a safety-catch lever and a primary latching lever swingable in horizontal planes and engageable sequentially with the keeper head on closing of the lid, said levers being mounted to swing independently of each other, and a hand-operable lever on said latch member operable from the front end of the hood to move said levers to releasing position.

10. A latch as defined in claim 9, in which said hand-operable lever engages said safety-catch lever and said primary latching lever and withdraws them substantially simultaneously from the path of the keeper head.

11. In a latch such as described, upper and lower carrying members, a post-like keeper fixed to one of said members and having a terminal head, a cooperating latch member fixed to the other of said members and provided with an elongated forwardly and rearwardly directed guide channel for guiding the lid of the hood to closed position by engagement with the keeper head, said channel having opposite side walls between which the keeper head is latched, said channel having associated therewith laterally thereof levers for so latching the keeper head, one of said levers being a safety-catch lever and the other being a primary lever, and a hand-operable lever on said latch member operable from the forward end of the hood for releasing said levers from their respective latching positions.

12. A latch as defined in claim 11, in which said safety-catch lever and said primary latching lever are in superposed relationship and of elbow formation, said hand-operable lever also being of elbow formation and adapted to engage extended ends of the safety-catch and primary levers.

13. In a latch such as described having upper and lower carrying members respectively on the lid and on the lower fixed part of a post-like keeper fixed to one of said members and having a terminal head, a latch member carried by the other of said members having substantially parallel walls between which the keeper head is confined when the lid is being closed for guiding the lid toward the closed position, a spring-biased pivoted safety-catch lever carried by said latch member and swingable in a substantially horizontal plane to engage the keeper head, a spring-biased keeper-head-engaging primary latching lever associated with one of said walls intermediate of the wall height and swingable in a plane substantially parallel to the operating plane of said safety-catch lever, and lever means carried by said latch member and operable manually from the forward end of the hood for swinging said safety-catch lever and said primary latch lever pivotally to move them to their releasing positions.

14. A latch such as described having upper and lower carrying members respectively on the lid and on the lower fixed part and a post-like keeper fixed to one of said members, a latch member carried by the other of said members having a guide channel for guiding the lid in closing directed longitudinally of the hood and open at one end, said guide channel being engageable with the distal end of the keeper and comprising opposite side walls extending vertically laterally of the keeper, one of said walls having associated therewith spring-biased levers pivoted adjacent said open end of the guide channel and swingable in parallel planes, one of said levers being a primary latching lever and the other being a safety-catch lever, and lever means carried by said latch member and operable manually from the forward end of the hood for moving the aforesaid levers to their releasing positions, said lever means comprising a lever pivoted adjacent the other of said walls at said open end of the guide channel.

15. In a latch for alligator-type hoods, upper and lower mounting or carrying members respectively applicable to the lid and to the lower fixed part of the hood structure, a keeper fixed to one of said members and having a latching head, a cooperating latch member fixed to the other of said members and presenting a centering and guiding channel projecting toward the keeper head to guide the lid preliminary to latching, said latch member having independent primary and secondary latching members laterally of said channel cooperating with the keeper head and providing for latching the lid in fully closed and partially closed positions, said primary and secondary members being constituted by levers having latching lugs movable into and out of said centering and guiding channel, said latch member being provided with a swingable manually operable lever operable from the forward end of the hood for releasing both the primary and secondary latching members, and a resilient biasing structure engaging the keeper to urge the keeper against the primary latching member in the fully closed position of the lid.

References Cited in the file of this patent

UNITED STATES PATENTS

| | | |
|---|---|---|
| 1,733,128 | Mauborgne | Oct. 29, 1929 |
| 2,199,467 | Saunders | May 7, 1940 |
| 2,253,660 | Tell | Aug. 26, 1941 |
| 2,256,465 | Brubaker | Sept. 23, 1941 |